United States Patent [19]

Duncan

[11] 4,302,210

[45] Nov. 24, 1981

[54] FIREPLACE LOG

[76] Inventor: Norman B. Duncan, 301 S. Highland Ave., Bay C, Las Vegas, Nev. 89106

[21] Appl. No.: 107,668

[22] Filed: Dec. 27, 1979

[51] Int. Cl.[3] .......................... A41G 1/00; C10L 5/36

[52] U.S. Cl. .......................................... 44/24; 156/61; 428/17

[58] Field of Search ................ 44/40, 10 B, 15 D, 24; 428/17, 15; 156/61

[56] References Cited

U.S. PATENT DOCUMENTS

| | | | |
|---|---|---|---|
| 3,377,229 | 4/1968 | Bryan | 428/17 X |
| 3,402,031 | 9/1968 | Schick et al. | 44/40 X |
| 3,829,297 | 8/1974 | Crawford | 44/15 D |
| 4,040,796 | 8/1977 | Vincent et al. | 44/40 X |
| 4,043,765 | 8/1977 | Tanner | 44/40 X |

FOREIGN PATENT DOCUMENTS

| | | | |
|---|---|---|---|
| 315006 | 1/1931 | United Kingdom | 44/15 D |

*Primary Examiner*—Henry F. Epstein
*Attorney, Agent, or Firm*—Harvey B. Jacobson

[57] ABSTRACT

A molded artificial log for burning and producing heat comprising sawdust, wax, cotton lint, a hardwood charcoal powder, and a binder is disclosed. A specific proportion of the components are mixed together and molded by an extrusion device to produce a long burning artificial log. The artificial logs have general use in fireplaces and wood burning stoves and are substantially made of renewable plant components and waste products providing an environmentally valuable energy resource.

11 Claims, No Drawings

FIREPLACE LOG

BACKGROUND OF THE INVENTION

Field of the Invention

The present invention relates to artificial logs and the manufacture thereof. Artificial logs are known and have been sold commercially for use in home fireplaces. Such logs have been scented and composed of materials which provide different colored flames to form a pleasant environment for the user, but do not burn and produce heat for long periods of time, being primarily used as starters for natural wood logs or flame additives to produce the variety of colors.

Wood burning fireplaces and stoves for heating homes and buildings and even for cooking are being used in greatly increased numbers as the wood fuel costs less than oil and gas heat and more importantly is an energy resource which is renewable. However, for home use, even the cost of wood fuel has risen dramatically and it is not yet known whether enough wood fuel can be furnished to provide a viable alternative to the non-renewable energy sources without doing irreparable harm to forest lands. There is a need therefore for a long burning fuel source which can produce the necessary heat at lower expense and be comprised of renewable materials which can be utilized without damaging the environment.

The present invention provides for a molded artificial log for use in fireplaces or wood burning stoves. The artificial log of the present invention is long burning and can produce heat for many hours. The artificial log is formed from renewable plant components and waste materials from other industries which are molded together to produce an efficient, renewable and environmentally valuable energy source.

SUMMARY OF THE INVENTION

The present invention provides for long burning and heat producing artificial logs. The artificial log comprises a molded mixture of specific amounts of renewable plant components and wax as a fuel. In its broadest sense, the artificial log comprises as components, sawdust splinters, wax, cotton linter, charcoal powder, and a binder. A specific blend of the components comprises by weight about 35–45% sawdust splinters, 35–45% wax, 2–5% cotton linter, 15–25% charcoal powder, and 2–5% binder.

Accordingly, an object of the invention is to provide an artificial log for use in fireplaces and wood burning stoves.

Another object of the invention is to provide a long burning and heat producing artificial log.

Still another object is to produce an artificial log by combining specific amounts of renewable plant products and waste materials with wax and extrusion molding the combined components to provide a fuel efficient and environmentally valuable renewable energy resource.

These together with other objects and advantages which will become subsequently apparent reside in the details of the product composition, method of manufacture and use thereof as more fully hereinafter described and claimed.

DETAILED DESCRIPTION OF THE INVENTION

The artificial log of the present invention is formed by molding, such as extrusion molding, a unique combination of renewable plant products, waste components and wax. The components utilized to produce the artificial log are sawdust splinters, wax, cotton linter, charcoal powder, and a binder.

The broad and preferred blend of the above components comprising the artificial log are as follows (by weight):

| COMPONENT | BROAD RANGE | PREFERRED RANGE |
|---|---|---|
| Sawdust splinters | 35–45% | 38–42% |
| Wax | 35–45% | 35–40% |
| Cotton linters | 2–5% | 3% |
| Binder | 2–5% | 2% |
| Charcoal Powder | 15–25% | 15–20% |

The sawdust splinters are waste products from sawmills, plane mills and the like and are dried so as to have a moisture content of 10% or less by weight per pound.

A wide variety of waxes can be utilized as a component in the artificial log of the present invention. Some preferred materials are refined wax with a congealing point of 62° C. (144° F.) such as a white candle wax; a petroleum wax (unrefined) with a low melting point of 110° F.; and a commercial wax, Chevron Altomont Wax which has a melting point of 120° F. The wax component provides fuel for the continual burning of the log.

The cotton lint or linters is a waste product of the garment industry and is also referred to as a waste product of velour. The cotton linters are used to aerate the artificial log to increase the oxygen content and thus further assist burning of the log.

While many binders can be utilized, a non-toxic binder of cellulose is preferred. The cellulose binder can be of any moldable form including fine powders, fibers or plastic consistency. A preferred cellulose is Klucel PH 100 manufactured by Hercules Corporation. The Klucel PH 100 is mixed with a solvent, such as methanol or any other light alcohol to form a light gel, and blended with the cotton linters to serve as the binder.

The charcoal powder preferred is one formed from Mesquite hardwood. Mesquite is a shrub or tree found primarily in the Southwest United States, Mexico and Central America. It grows wild in these areas and invades productive rangelands and competes with grass and other forage plants. The control or eradication of mesquite is costly and a commercial use for mesquite could partially offset the cost of eradication and thus range improvement would be more practical on many marginal areas. The mesquite hardwood is kiln charred to produce charcoal, then crushed to a fine powder of 16–300 mesh size. The small size is more suitable in the method of manufacturing the artificial log. Reference is made to a forest service publication; *Research Notes, Rocky Mountain Forest and Range Experiment Station,* No. 15, February 1955, entitled the "Production of Charcoal from Arizona Mesquite", by E. S. Kotok. Along with the wax component, the mesquite charcoal component is a primary fuel source for the burning of the log.

The artificial log of the invention can be manufactured by mixing and blending the above ingredients so that the component blend is even and well mixed. The mixed and blended components are molded into logs, for example, by feeding the component blend into a worm-gear extruder and compressing to about 350 psi. As the component blend is extruded from the cylindrical tubes of the extruder, small impressions such as ¼ inch by ¼ inch are made on each side of the bottom half of the log. Scratching along each side of the indentations will rough up the log material, thus making it easy to ignite, due to the sawdust splinters and the cotton linters serving as a wick for the wax content and mesquite charred hardwood. The components can be mixed and molded into many sizes, shapes, or lengths to produce an artificial log.

The artificial log of the present invention when cut to a conventional size can burn (produce flame) and put out heat for lengths of time exceeding 6-7 hours. Further, as can be seen by the above description of the individual components, the artificial log is made up of natural products, most of which are renewable resources and components which are waste products from other industries, providing an efficient, renewable and environmentally valuable energy resource.

The example shown below is one preferred blend of components and should not be so construed as to limit the invention.

EXAMPLE 1

The following ingredients were combined (percent by weight basis):

| | |
|---|---|
| Sawdust splinters | 41% |
| Wax (refined, congealing point 144° F.) | 38% |
| Cotton linters "velour" | 3% |
| Klucel PH 100 | 2% |
| Mesquite charcoal (16-300 mesh) | 16% |

The combined ingredients are mixed to a heavy dough-like mixture and then placed in a worm-fed extruder and compacted approximately 350 psi. The extruded and compacted material was then cut to a length of 17 inches width and a 4½ inch diameter, producing an artificial log of 8 pounds of combustable fuel.

The log was burn tested using as a definition of the end of the burning period, the point when the flame width falls below 6 inches. Using this criteria, the burning time for the log was about 3¼ hours. The core of the log glowed like a briquette under a heavy ash layer and put out heat for an additional 3¾ hours. The heat period may vary, depending upon how often and how much the insulating layer is disturbed.

The individual components can be varied within their broad ranges to provide logs with quicker start up times, longer flame or burning times, and greater or less consolidation of the log. In some instances, it may be possible to remove the binder and use a higher wax content as a binder and a fuel source. Other materials may be added in minor amounts, for example, materials which would provide various scents or flame colors.

The foregoing is considered as illustrative only of the principles of the invention. Further, since numerous modifications and changes will readily occur to those skilled in the art, it is not desired to limit the invention to the exact composition shown and described, and accordingly, all suitable modifications and equivalents may be resorted to, falling within the scope of the invention.

What is claimed as new is as follows:

1. An artificial log comprising by weight an evenly blended molded mixture of about 35-45% sawdust having a moisture content of about 10% by weight or less, 35-45% wax providing fuel for the continual burning of the log, 2-5% cotton linters for aerating the log and increasing the oxygen content thereof during burning, 15-25% charcoal powder fuel and sufficient binder to produce satisfactory consolidation during molding.

2. The artificial log of claim 1 wherein said binder is present in amounts of about 2-5% by weight.

3. The artificial log of claim 2 wherein said binder comprises cellulose.

4. The artificial log of claim 3 wherein said charcoal powder is produced from mesquite hardwood.

5. The artificial log of claim 4 wherein said charcoal powder has a size of about 16-300 mesh.

6. The artificial log of claim 5 comprising by weight about 38-42% sawdust, 35-40% wax, 3% cotton linters, 15-20% charcoal powder, and 2% binder.

7. The artificial log of claim 6 comprising by weight about 41% sawdust, 38% wax, 3% cotton linter, 16% charcoal powder, and 2% binder.

8. A method of forming an artificial log comprising mixing and blending by weight about 35-45% dried sawdust, 35-45% wax providing fuel for the continual burning of the log, 2-5% cotton linters used to aerate the formed log to increase the oxygen content during burning, 15-25% charcoal powder fuel and 2-5% binder, forming an even mixture of the components and feeding said mixture into an extruding device and compacting and extruding said mixture at about 350 psi.

9. The method of claim 8 wherein said binder is cellulose.

10. The method of claim 9 wherein said charcoal powder is formed from mesquite hardwood.

11. The method of claim 8 further including forming impressions in the log and scratching along the sides of the impressions to roughen the log material, thereby making the log easy to ignite.

* * * * *